Sept. 8, 1931.  F. S. CARR  1,822,565
SEPARABLE FASTENER
Original Filed Nov. 3, 1926
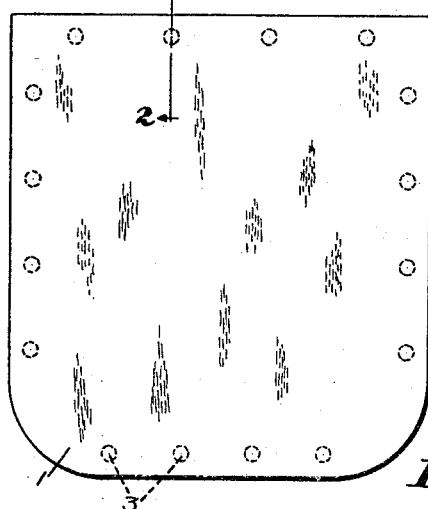
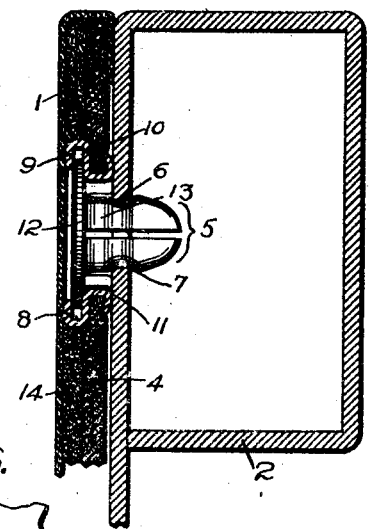
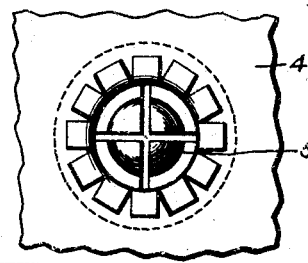
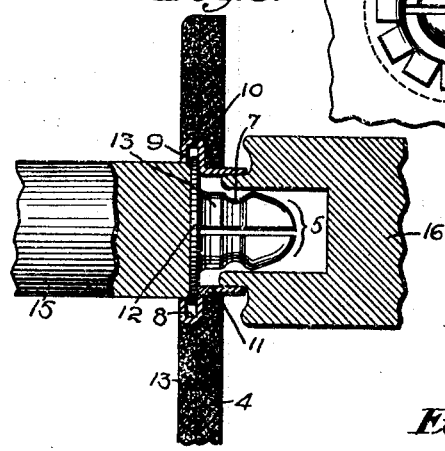
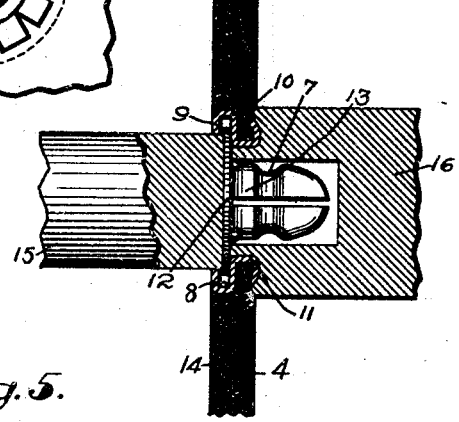
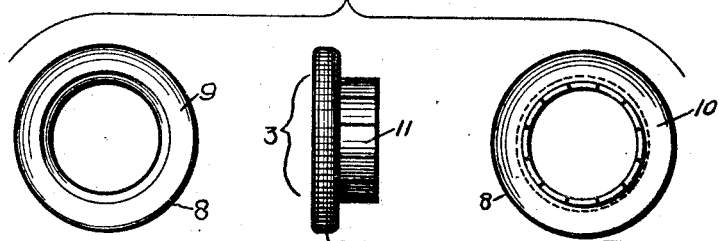
Inventor:
Fred S. Carr,
by Emery Booth Janney & Varney
Attys Patented Sept. 8, 1931

1,822,565

UNITED STATES PATENT OFFICE

FRED S. CARR, OF NEWTON, MASSACHUSETTS; MOSES F. CARR, EXECUTOR OF ESTATE OF SAID FRED S. CARR, DECEASED, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE FASTENER

Application filed November 3, 1926, Serial No. 145,958. Renewed January 31, 1931.

This invention aims to provide improvements in separable fasteners of a type particularly adapted for upholstery installations.

In the drawings, which illustrate a preferred embodiment of my invention:—

Figure 1 is an elevation of an upholstered door;

Fig. 2 is a section on the line 2—2 of Fig. 1, being partly in elevation;

Figs. 3 and 4 show two steps in securing the fastener unit to the panel;

Fig. 5 includes a front, a side and a rear elevation of the casing of the fastener unit; and Fig. 6 is a view of a portion of the panel and a fastener unit looking toward the inner face of the panel.

Referring to the drawings, I have shown a shiftable fastening device in connection with securing an upholstered part 1 to a frame part 2, as shown in Figs. 1 and 2.

The fastening device which I have selected for illustrative purposes, comprises a casing 3 secured to the backing 4 of the upholstered part (Fig. 2) and a stud member 5 assembled with the casing 3, in a manner which permits limited lateral shifting of the stud in all directions. The stud member projects beyond the inner face of the upholstered part 1 for engagement with a socket presented by the frame part 2. In this instance, as shown in Fig. 2, the socket is an aperture 6 in the frame part 2 and the stud may be snapped through the aperture so that the neck 7 of the stud engages the wall surrounding the aperture.

The casing, as illustrated in Figs. 5 and 6, is pressed from a single piece of metal and has an annular peripheral wall 8, with flanges 9 and 10 extending inwardly from the wall in spaced relation, and a slit tubular rivet 11 extending outwardly from the flange 10.

The stud member 5 is assembled with the casing with its base 12 located in the space between the flanges 9 and 10 and the resilient headed shank portion 13, projecting through the rivet 11. The base 12 is smaller in diameter than the diameter of the space enclosed by the wall 8, as is the shank 13 smaller in diameter than the internal diameter of the rivet 11. Thus the stud member may shift to a limited extent in any lateral direction relative to the casing.

When assembling the stud unit to the backing, as shown in Figs. 3 and 4, the rivet 11 is entered into the aperture 14 preformed in the backing, and then a pair of opposed die members 15 and 16 cooperate to clinch the rivet against the inner face of the backing. The rivet is divided by a series of slits which make it easier to upset because the portions between the slits fold outwardly and downwardly like a series of petals, as shown in Fig. 6.

In order to prevent clinching of the flanges 9 and 10 of the casing against the base 12 of the stud during the clinching operation, the aperture surrounded by the flange 9 is made large enough to permit the die 15 to back-support the inner portion of the flange 10, as well as the rivet 11 while the dies are pressed toward each other to upset and clinch the rivet 11. When the dies are withdrawn, the stud member may shift freely relative to the casing for alignment with the aperture provided in the frame part 2.

A panel equipped with a plurality of the stud units of the type above described may be easily and quickly applied to a frame and the shiftability of the studs permit accurate alignment of the edges of the panel with the frame.

While I have shown and described a preferred embodiment of my invention, I do not wish to be limited thereby, my invention being best described in the following claim.

I claim:

A fastener unit for upholstery and like installations comprising a casing having a peripheral wall, a flange extending inwardly from one edge of said wall and terminating at an aperture, a tubular rivet portion extending outwardly from the inner periphery of said flange, a laterally shiftable fastener part surrounded by said wall and adapted to rest against said flange and means extending inwardly from the other edge of said wall a substantially less distance than said flange to provide means for holding said fastener part in assembly with said casing while permitting insertion of a tool into said casing to back-support said flange while said rivet is being set as and for the purposes illustrated and described.

In testimony whereof, I have signed my name to this specification.

FRED S. CARR.